H. C. TRIPP.
WINDSHIELD CLEANER.
APPLICATION FILED MAY 19, 1920.
1,394,053.
Patented Oct. 18, 1921.
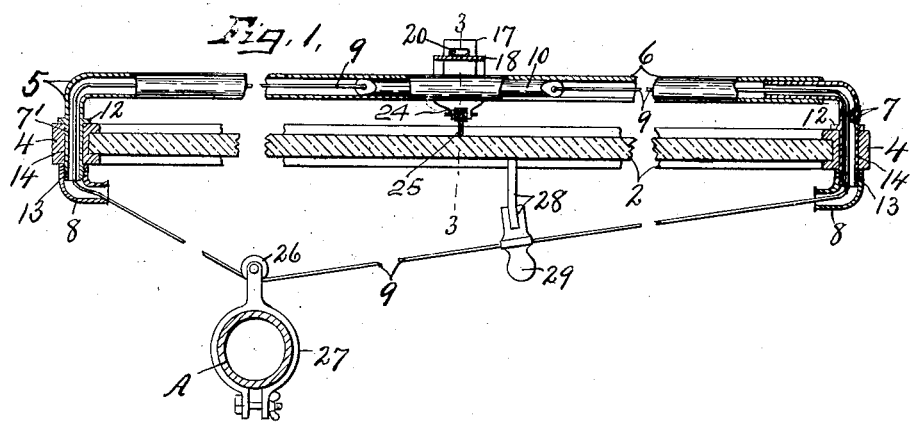
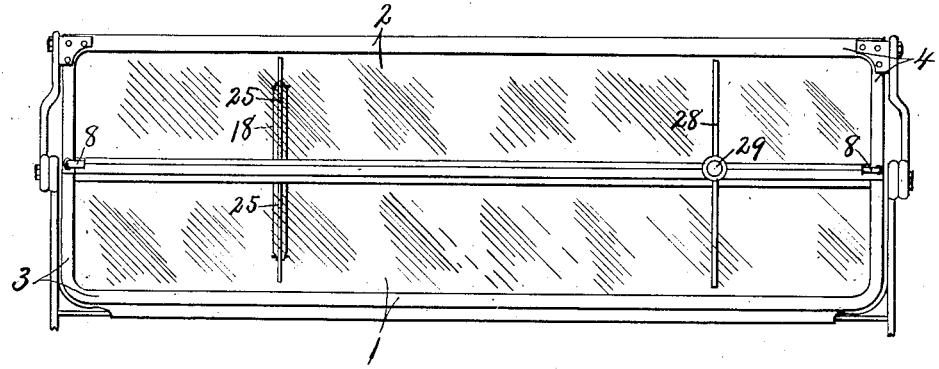
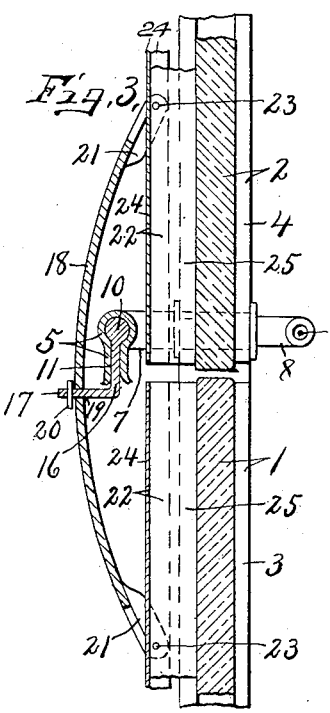
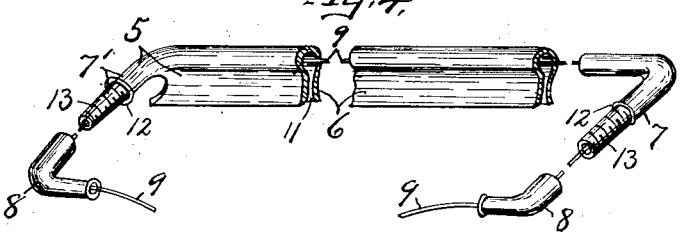
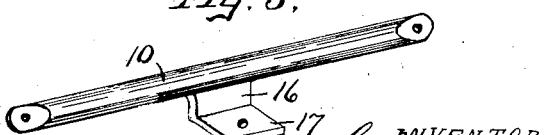
INVENTOR
H. C. Tripp
BY
Howard P. Denison
ATTORNEY

UNITED STATES PATENT OFFICE.

HENRY C. TRIPP, OF AUBURN, NEW YORK.

WINDSHIELD-CLEANER.

1,394,053.  Specification of Letters Patent.  Patented Oct. 18, 1921.

Application filed May 19, 1920. Serial No. 382,486.

*To all whom it may concern:*

Be it known that I, HENRY C. TRIPP, of Auburn, in the county of Cayuga, in the State of New York, have invented new and useful Improvements in Windshield-Cleaners, of which the following, taken in connection with the accompanying drawings, is a full, clear, and exact description.

This invention relates to certain improvements in windshield cleaners adapted to be used more particularly with windshields having lower and upper sections, and involves the use of a pair of wipers pivotally attached to the opposite ends of a bow spring, which in turn is detachably mounted upon a supporting member, the latter being slidable along the windshield in a tubular guide, the ends of which are fastened to the frame of the upper windshield section.

The main object is to mount the wiper supporting guide directly upon the frame of one of the windshield sections in such manner that its direct support or carrier may be moved from side to side throughout the length of the shield sections by means of a cable passing around the ends of the shield to the rear thereof within easy reaching distance of the seat of the driver where it may be readily grasped in the hand and moved endwise in either direction for effecting a corresponding movement of the wipers.

Another object is to enable the wiper supporting spring with the wipers thereon to be easily and quickly removed from the sliding support without disturbing any of the other parts.

A further object is to pass a cable through a sheave on the steering post where it is easily accessible to the driver for manipulating the sliding support for the wipers.

A still further object is to provide the cable at the rear of the shield with a supplemental wiper for cleaning the corresponding sides of the glass simultaneously with the operation of the wipers across the front face of the glass.

Other objects and uses relating to specific parts will be brought out in the following description.

In the drawings:

Figure —1— is a horizontal sectional view, partly in top plan and partly broken away, of a windshield and cleaning apparatus therefor embodying the various features of my invention.

Fig. 2 is a rear elevation of a two part shield and my improved cleaning device attached to the upper shield section.

Fig. 3 is an enlarged transverse vertical sectional view of a portion of the windshield and cleaning device taken in the plane of line 3—3, Fig. —1—.

Fig. 4 is a perspective view of the detached parts of the guide tube, the main body of the tube at the front of the windshield being broken away.

Fig. 5 is a perspective view of the detached sliding support for the wiper supporting spring.

In order that my invention may be clearly understood, I have shown a two part windshield consisting of a lower section —1— and an upper section —2—, both of which may be hinged to swing forwardly and rearwardly in any well known manner not necessary to herein illustrate or describe, except that the upper section is usually hinged near its upper edge, while the lower section may be fixed or hinged, the lower section being provided with a metal frame —3— extending along its lower and side edges, while the upper section is provided with a similar metal frame —4— extending along its upper and side edges.

A tubular guide —5— consisting of a main body —6— and end sections —7— and —8— is suitably mounted upon the lower ends of the side arms of the frame —4— of the upper shield section in a manner presently described for receiving a cable —9— and a sliding rod or bar —10— which latter is movable in the main body —6—.

The main body of the guide tube —5— is provided with a lengthwise slot —11— in its lower side, the front and rear walls of said main body being extended downwardly and flared outwardly to shed water and snow from the slot —11—, the slot —11— serving to receive a portion of the sliding bar —10— presently described.

The main body —6— of the guide tube extends from side to side of the upper windshield frame —4— and is provided at one end with a reduced rearwardly extending offset or elbow portion —7'— having a shoulder —12— and a threaded end —13— extending a sufficient distance beyond the shoulder —12— to pass entirely through an aperture —14— in one of the upright arms of the upper frame —4— near the lower end thereof.

The tubular section —7— is made in the form of an elbow similar to the part —7'— in that it has a shoulder —12— and a threaded extension —13— adapted to pass through an aperture —14— in the corresponding upright portion of the frame —4— near the lower end thereof and corresponds with the opposite aperture —14— previously mentioned.

One of the arms, as —15—, of the elbow section —7— is adapted to enter the adjacent end of the main body —6— with an easy sliding fit, the object in making the main body section —7— separate from the main body being to permit the insertion and removal of the sliding bar —10— through the open end of the main body before the elbow section —7— is placed in operative position in the same open end, the sliding connection between the two parts —6— and —7— also permitting the adjustment of the threaded portions —13— to conform to the spacing of the apertures —14—.

When the threaded portions —13— are passed through their respective apertures —14— they are engaged by the tubular elbow sections —8— which are threaded internally at one end to screw upon their corresponding threaded portions —13— against the rear face of the adjacent upright arms of the frame —4—, thereby drawing the shoulders —12— against the front faces of the same arms to firmly clamp the guide tube in place, at which time the inner open ends of the elbow sections —8— will face each other in substantially the same horizontal plane and also in substantially the same vertical plane to permit the ends of the cable —9— to be drawn therethrough.

The sliding bar —10— is relatively short as compared with the length of the guide tube —5— between the arms —7— and —7'— to enable the wiper supporting spring which is mounted thereon to move nearly the entire length of the windshield, said bar being slidable in the upper cylindrical portion of the main body —6— and is provided with a central pendent lug —16— extending downwardly through the open side of the slot —11— below the lower edge of the main body —6— where it is provided with a forwardly projecting flange —17— for receiving and supporting the wiper supporting spring, as —18—, as shown more clearly in Fig. —3—.

The spring —18— is preferably of the single leaf bow type having its central portion provided with a slot —19— of just sufficient size to easily receive the flange —17— upon which the spring is held by means of a cotter pin —20— or equivalent locking device.

This spring —18— is preferably disposed in an upright position with its central portion arched forwardly at the front of the guide tube —5—, the lower and upper ends of said spring being provided with rearwardly bent pairs of ears —21— for receiving between them separate wipers —22— which are pivoted to said ears at —23— substantially midway between their ends. These ears are disposed in substantially the same vertical plane and serve to hold the same wipers in the same plane with their wiping edges spring tensioned against the front face of the glass of the windshield sections —3— and —4—, it being understood that the cotter key or pin —20— holds the central portion of the spring under tension while the walls of the slot —11— serve to hold the lug —16— against forward and rearward movement relatively to the guide tube.

The wipers are substantially identical and interchangeable and are of sufficient length to extend from the lower to the upper edges of their respective windshield sections so that when moved laterally or lengthwise of the guide tube —5— they will clean practically all of the areas of the glass portions of the front face against which they are spring pressed by the same spring —18—.

Each wiper consists of a flexible strip —25— of rubber or equivalent pliable material and a U-shaped holder —24— therefor, one edge of the strip —25— being firmly held between the opposite sides of the metal section —24— while its opposite edge projects rearwardly some distance beyond the corresponding edge of the metal section to allow the free edge of the strip to deflect laterally as it is drawn across the glass and thereby assure a more perfect contact of all portions of the rear edge of the strip with said glass during the wiping operation.

The cables —9— after being attached to opposite ends of the sliding bar —10— are drawn in opposite directions through the main body —6— and are then brought forwardly through the tubular branches —7— and —7'— and elbow —8— to the rear of the windshield where it is passed around a sheave —26—, the latter being mounted upon a split collar —27— which is clamped to the steering post —A— of the machine.

By this arrangement, the rear portion of the cable —9— is brought some distance to the rear of the windshield or directly under the steering wheel where it may be easily grasped by the hand of the operator and drawn endwise in either direction to effect a corresponding movement of the sliding bar —10— carried thereby.

An additional wiper —28— is attached to the rear portion of the cable —9— and is provided with a handle —29— whereby it may be pressed against and moved across the rear face of the windshield as the cable is operated in either direction, or the handle —29— may serve as a means for drawing the cable endwise to operate both sets of wipers, it being understood that the cable is sufficiently slack to allow the wiper —28— to be pressed against the windshield nearly throughout its length.

The manner of assembling and operation of the device will now be readily understood upon reference to the foregoing description and the accompanying drawing, but it is evident that certain changes may be made in the detail construction without departing from the spirit of my invention.

What I claim is:

1. A cleaning device for windshields comprising, a tubular guide extending lengthwise of the windshield and having its ends attached to the windshield frame, said tubular guide having a slot through its lower side, a bar slidable endwise in the guide and provided with an extension projecting through the slot, a bow spring mounted on said extension, separate wipers mounted on the ends of the spring, and a cable passed through the tubular guide and attached to the sliding bar.

2. A cleaning device for windshields comprising, a tubular guide extending lengthwise of the windshield and having its opposite ends attached to the windshield frame, said guide being composed of sections telescoping with each other for longitudinal adjustment, one of the sections having a lengthwise slot in one side, a bar slidable endwise in the slotted section and having an extension projecting through the slot, a wiper support mounted on the extension, a wiper mounted on the support and a cable passed through the tubular guide and attached to opposite ends of the bar.

3. A cleaning device for windshields comprising, a tubular guide having offset threaded portions passed through apertures in the frame, said guide having threaded elbow sections screwed upon the threaded offset portions for clamping the same to the windshield frame, a bar slidable endwise in the guide, a wiper support mounted on the bar, a wiper mounted on the support, and a cable passed through the tubular guide and attached to the bolt for operating said bar.

In witness whereof I have hereunto set my hand this 6th day of May 1920.

HENRY C. TRIPP.

Witnesses:
  H. E. CHASE,
  ROSE G. CARROLL.